US009827656B2

(12) United States Patent
Whitaker

(10) Patent No.: US 9,827,656 B2
(45) Date of Patent: Nov. 28, 2017

(54) INJECTOR SLEEVE INSTALLATION TOOL AND REMOVAL TOOL KIT

(71) Applicant: Tony Whitaker, Campbellsville, KY (US)

(72) Inventor: Tony Whitaker, Campbellsville, KY (US)

(73) Assignee: Whitaker Tools, Inc., Campbellsville, KY (US)

( * ) Notice: Subject to any disclaimer, the term of this patent is extended or adjusted under 35 U.S.C. 154(b) by 252 days.

(21) Appl. No.: 14/120,190

(22) Filed: May 2, 2014

(65) Prior Publication Data

US 2014/0366351 A1 Dec. 18, 2014

Related U.S. Application Data

(63) Continuation-in-part of application No. 13/987,420, filed on Jul. 23, 2013, now Pat. No. 9,718,156.

(60) Provisional application No. 61/854,847, filed on May 2, 2013.

(51) Int. Cl.

| | |
|---|---|
| ***B23P 19/04*** | (2006.01) |
| ***B25B 27/06*** | (2006.01) |
| ***B25B 27/02*** | (2006.01) |
| ***B25B 27/00*** | (2006.01) |

(52) U.S. Cl.

CPC ........ *B25B 27/062* (2013.01); *B25B 27/0035* (2013.01); *B25B 27/023* (2013.01); *Y10T 29/53883* (2015.01)

(58) Field of Classification Search

USPC .......................... 29/264, 237, 266, 270, 278

See application file for complete search history.

(56) References Cited

U.S. PATENT DOCUMENTS

| | | | | |
|---|---|---|---|---|
| 2,050,005 A | | 8/1936 | Heegeman | |
| 2,424,681 A | | 7/1947 | Eberhart | |
| 3,685,124 A | | 8/1972 | Wuertz | |
| 4,204,784 A | * | 5/1980 | Eckendorff | B23C 3/056 408/111 |
| 4,967,468 A | | 11/1990 | Vossbrinck et al. | |
| 5,075,948 A | | 12/1991 | Maier | |
| 5,090,102 A | | 2/1992 | Lovell | |
| 5,664,328 A | | 9/1997 | Fink et al. | |
| 5,784,783 A | | 7/1998 | Carpenter | |

(Continued)

*Primary Examiner* — Joseph J Hail
*Assistant Examiner* — Shantese McDonald
(74) *Attorney, Agent, or Firm* — Carrithers Law Office PLLC

(57) ABSTRACT

A tool for inserting and fastening a replacement injector sleeve in the cylinder head of a diesel engine. The tool is part of an injector sleeve tool kit which also includes an injector sleeve removal tool. The installation tool includes an expandable mandril which is inserted into the injector sleeve and expands a portion of the sleeve causing a press fit of the sleeve within the cylinder head. The sleeve removal tool includes a tap having a longitudinal body and a threaded cutting head at one end and a bolt having a head at the other end. An extraction nut is threaded onto the threaded shaft of the drive member followed by a bearing surface member such as a spacer. A hollow cylinder or support sleeve having an internal diameter greater than the injector sleeve to be removed and an external diameter less than the diameter of the sleeve bore includes a shoulder member.

13 Claims, 14 Drawing Sheets

(56) References Cited

U.S. PATENT DOCUMENTS

| | | | | |
|---|---|---|---|---|
| 6,637,089 | B1 * | 10/2003 | English | B25B 27/023 29/237 |
| 6,990,713 | B2 | 1/2006 | Tally et al. | |
| 7,475,465 | B1 * | 1/2009 | Weiss | B25B 27/023 28/255 |
| 2003/0041431 | A1 | 3/2003 | Heflin | |
| 2003/0188410 | A1 | 10/2003 | English | |
| 2007/0145321 | A1 | 6/2007 | Lowery | |

* cited by examiner

INJECTOR SLEEVE INSTALLATION TOOL AND REMOVAL TOOL KIT

RELATED APPLICATIONS

This application claims priority from and is a continuation in part of U.S. application Ser. No. 13/987,420 filed on Jul. 23, 2013 and U.S. Provisional Patent application Ser. No. 61/854,847 filed on May 2, 2013 both of which are incorporated by reference herein in their entirety.

TECHNICAL FIELD

The present invention relates to the field tools used to install and remove a typically brass or bronze injector sleeve from a cylinder head in a diesel engine. These sleeves are press fit into a bore in the head. After years of use the sleeves will loosen or begin to leak and need to be replaced.

BACKGROUND OF THE INVENTION

An injector sleeve removal tool is described in Applicant's U.S. Pat. No. 8,490,263 which issued on Jul. 23, 2013.

Tools for the removal of injector sleeves have been described and patented in recent years. U.S. Pat. No. 5,784,783 by Carpenter for METHOD OF REMOVING AN INJECTOR SLEEVE issued on Jul. 28, 1998 claims a tool wherein one inserts rounded head into the sleeve. A cylinder with a reverse tapered edge is forced down onto the top edge of the sleeve. This flairs the top edge inward, thus capturing the rounded head within the sleeve. The rounded head is pulled up and the intent is that the flair will hold tight to the rounded head and the sleeve will be pulled out with the tool. This design has some inherent flaws. First, the flaring process forces the sleeve into the head even tighter than it would initially be. Second, if the sleeve is tight, as one would expect, the flair is likely to weaken and pull apart, whereupon, the rounded head comes out but the sleeve has been seated even tighter.

U.S. Pat. No. 5,090,102 by Lovell for DIESEL INJECTOR SLEEVE REMOVER issued on Feb. 25, 1992 claims a hollow, externally threaded tube which has been slit down one side. A rod is inserted in the tube which is conical at the bottom end. The rod sticks out of the slitted threaded end of the tube and the large end of the rod is a little larger than the threaded tube. The top end of the rod is connected to a slide hammer. The threaded sleeve is inserted into the sleeve. One tap of the hammer seats the threads of the tube into the bore of the sleeve because tapping the hammer down against the top of the sleeve forces the sleeve down onto the conical end of the rod and this causes the threaded tube to expand, thus forcing the threads to grab into the bore of the sleeve. Now the slide hammer is pulled up to drive the assembly out along with the sleeve. The primary weakness of this design presents itself in the case where the sleeve is very tightly held within the cylinder head. The threads won't have a strong enough hold and will simply chew and pull material out of the sleeve but leave the sleeve in place in the head.

SUMMARY OF THE INVENTION

An injector sleeve is used to seal each of the cavities in the top of a cylinder head or heads of a diesel. The sleeve maintains a clean environment within the cylinder head cavity by keeping external debris outside. The sleeve is generally made of brass or bronze and is sized to be pressed into the cavity. If the sleeve fails, leaks can occur and the sleeve must be replaced. This can require removal of the cylinder head, which is costly in terms of time and money. A huge savings is realized if the sleeve or sleeves can be removed without the removal of the cylinder head. The present invention is a tool which makes sleeve removal possible without removing the cylinder head.

A sleeve installation tool is disclosed herein which is used to fasten an injector sleeve within a diesel cylinder head. Further, a sleeve removal tool is disclosed herein used for removing an injector sleeve from the cylinder head of a diesel engine without the extra labor and cost of removing the entire head from the diesel engine.

One common type of injector sleeve is configured to be press fit into a diesel cylinder head. This type of sleeve is sized a few thousandths of an inch larger than the holes into which they are to be pressed. A simple punch shaped to fit the inside of the sleeve shell is used to force the sleeve into the cylinder head. The sleeve is set at the entrance of the cylinder head with the punch inserted therein. A hammer is then used to drive the sleeve home in the cylinder head.

However, a second type of injector sleeve is configured so that the sleeve freely goes into the hole in the cylinder head. Once there, a sleeve expanding tool is used to expand a portion of the sleeve to tightly fix the sleeve within the cylinder. This sleeve expanding tool is the part of the injector sleeve kit of this application.

The Injector Sleeve Removal Tool

A injector sleeve removal tool is disclosed herein and is used for removing an injector sleeve from the cylinder head of a diesel engine between the rocker arms while the head remains mounted to the engine block within the vehicle. The devices includes a tap having a longitudinal body having a threaded cutting head at one end and an axial threaded bore at the opposing end. A drive member comprises a bolt having a head at one distal end and a threaded shaft body portion. An extraction nut is threaded onto the threaded shaft of the drive member followed by a bearing surface member such as a spacer. A washer bearing surface member having an axial hole sized for movable engagement on the threaded shaft is disposed on the threaded shaft after the spacer. A hollow cylinder or support sleeve having an internal diameter greater than the injector sleeve to be removed and an external diameter less than the diameter of the sleeve bore includes a shoulder member projecting outwardly from the exterior of the support sleeve at a selected point. Moreover, a washer bearing surface member having a center hole is disposed onto the threaded end of a bolt having a holding nut threaded thereon spaced apart a selected distance from the threaded distal end. The threaded distal end of the bolt is inserted into and threadably engages threads of the tap nut so that the bolt is fastened to the tap. The end of the injector sleeve removal tool defining the tap assembly is passed through a hollow cylinder of a selected diameter sized so that the end edges of the tube rest on the surface of the cylinder head surrounding the injector sleeve to be removed. The washer bearing surface member is selected having an outer diameter large enough to provide a bottom surface for resting on the top edge of the hollow cylinder. The holding nut rests upon the top surface of the washer bearing surface member above the hollow cylinder. The head of the bolt opposite the tap assembly is rotated with a tool, whereby the distal end having the tap assembly turns to cut threads into the interior surface of the injector sleeve securing same. The head of the bolt is held in a stationary position and the holding nut is then turned and moved downwardly biasing the bottom surface of the washer bearing surface member against the top edges of the hollow cylinder pulling the injector sleeve upward and out of the cylinder head in order that a replacement injector sleeve can be pressed into place in the cylinder head.

The injector sleeve removal tool is described and can be fabricated by the following method. A thread cutting device commonly known as a tap is modified by attaching a threaded nut to the non-threaded end. This allows a bolt to be threaded into the nut and therefore fastened to the tap. A loose nut and a flat washer bearing surface member are put onto the bolt (in that order) before threading the bolt into the nut which was welded onto the end of the tap. This assembly is passed through a hollow cylinder sized to sit on the edge of the cylinder head just surrounding the injector sleeve to be removed. The flat washer bearing surface member is large enough so that the washer won't pass through but rests on the top edge of the hollow cylinder. The bolt (with the tap) is now used to cut 2 or three turns of threads into the injector sleeve. Now, the loose nut is tightened to gently and evenly withdraw the bolt assembly and the injector sleeve.

Alternative embodiments may have the bolt welded directly to the tap, or even simultaneously cast as one piece or any other stable method of attachment. Also, the flat washer bearing surface member and cylinder may be welded together or otherwise attached or fabricated together as one would make a can or pan.

Experience has shown that two or three turns of thread into the sleeve are sufficient to pull the sleeve. One superior aspect of this design is that one can turn in more threads if required. Also, the pulling method is the even, central and straight thrust provided when the loose nut is tightened against the flat washer bearing surface member. This is believed to be more stable and powerful than that of tools that use the uneven strikes of a slide hammer.

A major feature of the sleeve removal tool is that the sleeves are removed without having to remove the engine from the vehicle, saving time, labor, expense, and increasing safety.

The Injector Sleeve Installation Tool

As discussed above, one type of injector sleeve is configured to easily slip into place within the cylinder head and must then be fastened tightly in place. A sleeve installation tool is used to expand a portion of the sleeve to tightly fix the sleeve within the cylinder. The injector sleeve is a hollow brass or bronze shell which is roughly cylindrical with two open ends. The cylinder is roughly tapered in steps with the opening at the large end being larger than the opening at the small end. The installation tool is a two part roughly cylindrical mandrel which is longer than the injector sleeve. The first part of the mandrel is an outer shell. The distal end of the outer shell of the mandrel is divided into axially parallel sections that can spread apart and thus expand the diameter of the shell. The second part of the mandrel is a rod with external threads and a bolt head at one end and which is tapered in selected positions down the length of the rod. When the rod is forced down into the outer shell, the sections of the outer shell expand radially outward. The end of the outer shell which is opposite of the end with the expanding sections has internal threads. The tapered end of the rod is inserted into the interior threaded end. The rod further pushed into the outer shell until the external threads of the rod can be threaded into the internal threads of the outer shell. Thus, as the rod is pulled into the outer shell by twisting the bolt head, the tapered sections of the rod cause the expandable section of the outer shell to extend and expand radially outward. With the expandable sections of the outer shell inserted into the injector sleeve, the sleeve is also expanded, thus resulting in a press fit of the sleeve within the cylinder head.

The Injector Sleeve Kit

An injector sleeve kit includes the two tools described above: an injector sleeve removal tool and an injector sleeve installation kit.

Other objects, features, and advantages of the invention will be apparent with the following detailed description taken in conjunction with the accompanying drawings showing a preferred embodiment of the invention and appended claims.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

In accordance with the present invention, a tool is disclosed herein used for removing an injector sleeve from the cylinder head of a diesel engine without the extra labor and cost of removing the entire head from the diesel engine.

Figure 1:
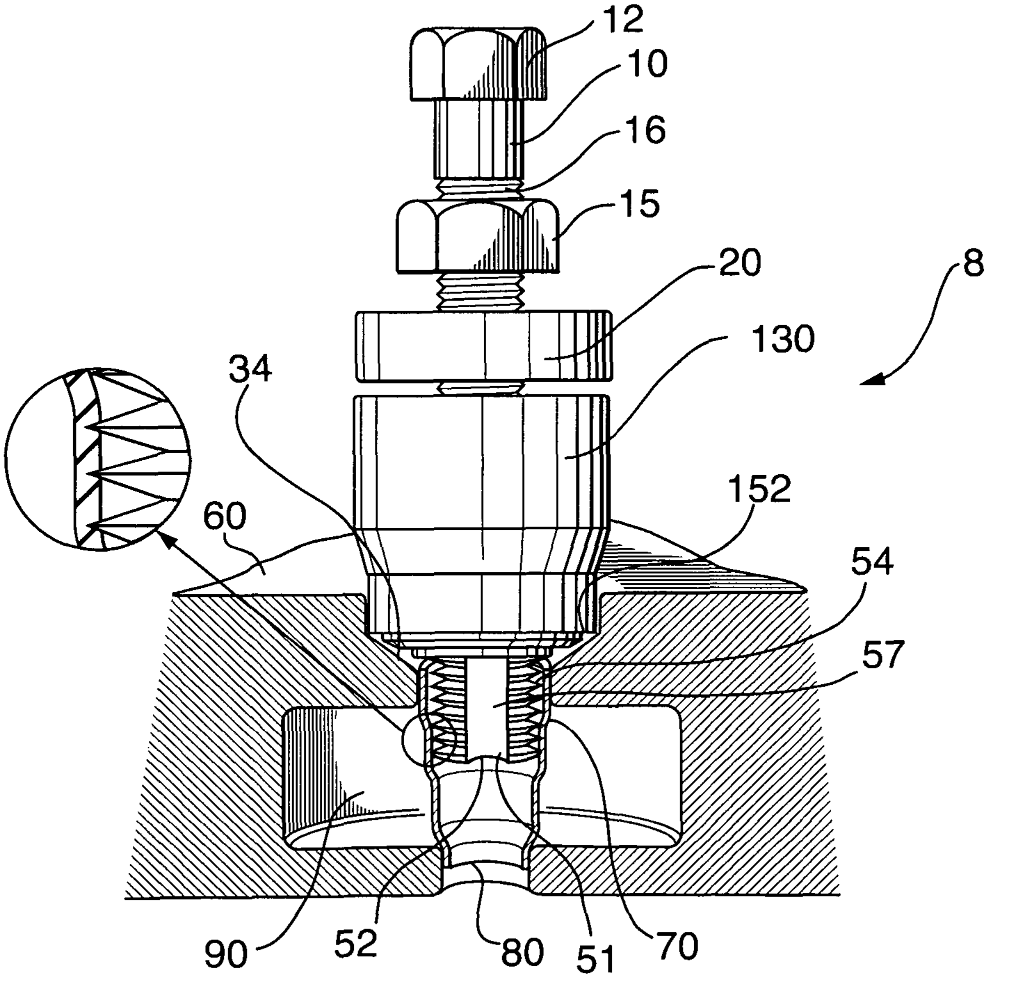
FIG. 1 is an oblique view of the injector sleeve removal tool assembly inserted into an injector sleeve which is press fitted into a cylinder head.

FIGS. 1-4 show the assembled tool 8 for removing an injector sleeve along with a portion of a cylinder head and described as follows. An axially movable threaded rotating extraction nut 15 is threaded onto a bolt 10 having a head 12 defining a holding means extending from a shaft having threads 16 at least along the distal end opposite the head 12. In the embodiment of FIG. 1, about one and one half inches of the threads 16 of bolt 10 extend through rotating non-ratcheting.

Figure 11:
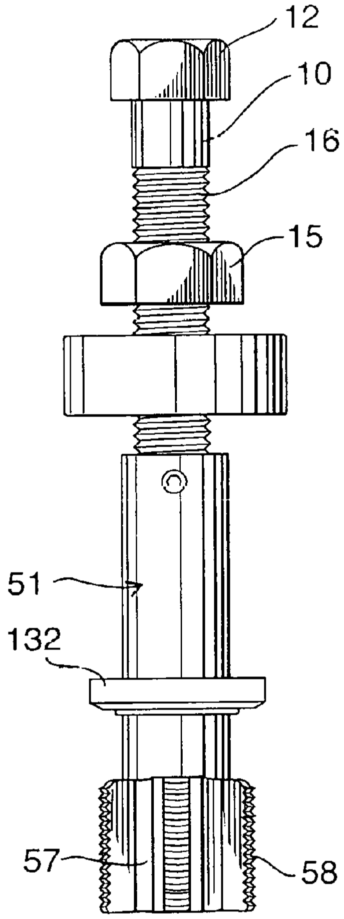
FIG. 11 is a perspective view of the injector sleeve removal tool of FIG. 10.

As seen in FIG. 11, tap 51 is rigidly attached to the bolt 10. The opposing distal end 52 of the tap 51 comprises a generally cylindrical threaded cutting head end portion 54 including threads which extend coaxially in a horizontal plane rather than an inclined plane such as typical of a screw. Moreover, the threads extend circumferentially around the end portion 54 in a discontinuous manner forming a plurality of smooth parabolic axial grooves 57 disposed between axial threaded sections 58. In at least one preferred embodiment, the six grooves are disposed between six threaded sections defining a cross sectional hexagon shape. Of course it is contemplated that the threads could be arranged in an inclined plane to bite into the inner wall of the sleeve 80.

A washer load bearing surface member 20, is disposed between the rotating nut 15 and a hollow sleeve or cylinder 130 which has a large enough inner diameter for tap 51 to rotatably move therein and for the injector sleeve 80 to easily slide up and the cylinder 130. The length of cylinder 130 must be longer than the tap 51 and the available threads left on the bolt 10 after the tool 8 is assembled with the rotating extraction nut 15, washer bearing surface member 20 and stationary nut 12. Enough threads 57 must be exposed to reach into and cut at least three threads into the interior side wall of an injector sleeve 80. The washer bearing surface member 20 can be of a selected thickness but must include a center hole (not shown) large enough to allow axial movement along the bolt 10. The diameter of the washer bearing surface member 20 must be at least large enough to engage the top end edge of the cylinder 60.

As shown in FIG. 1, the end 152 of the cylinder 130 rests in the cylinder head 60 and more particularly within a conical depression or seat 34 formed around the injector bore of the cylinder head 60.

Figure 2:
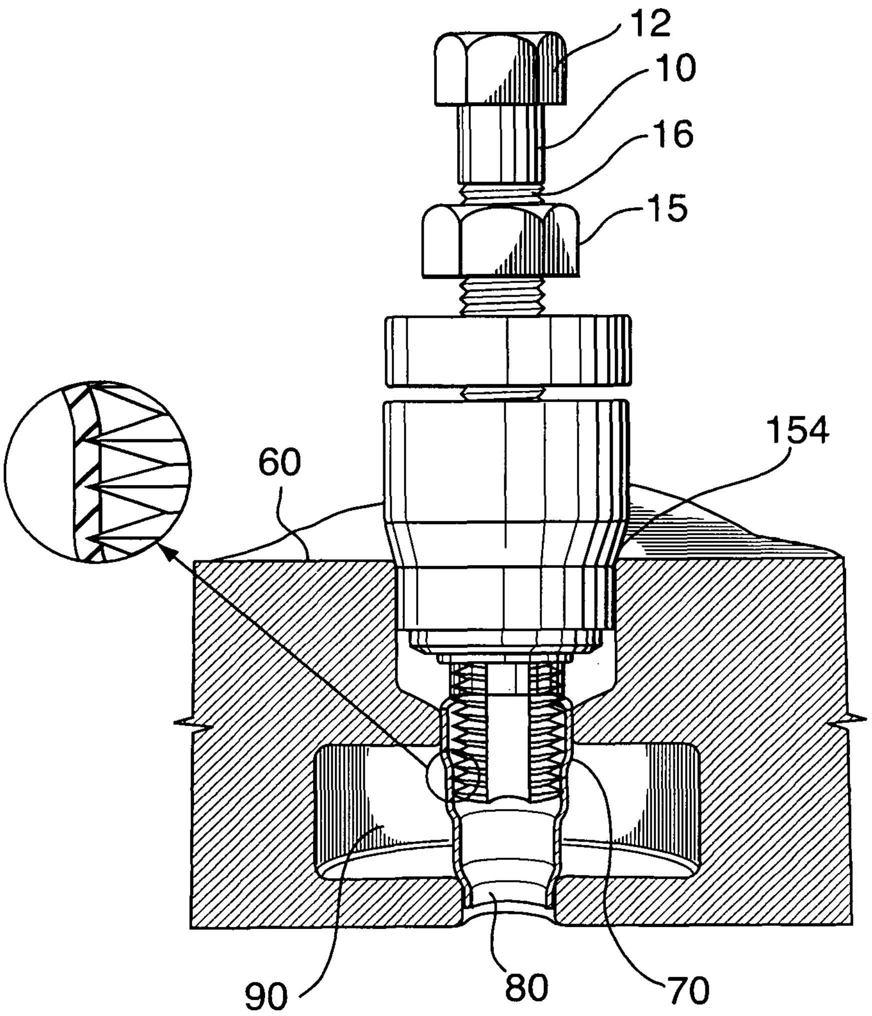
FIG. 2 is another embodiment of the injector sleeve removal tool.

As shown in FIG. 2, an annular or circumferential tapered stop means 154 is formed by the cylinder 130 whereby the taper 154 contacts the cylinder head 60 of the engine limiting penetration of the cylinder 130 therein.

Figure 3:
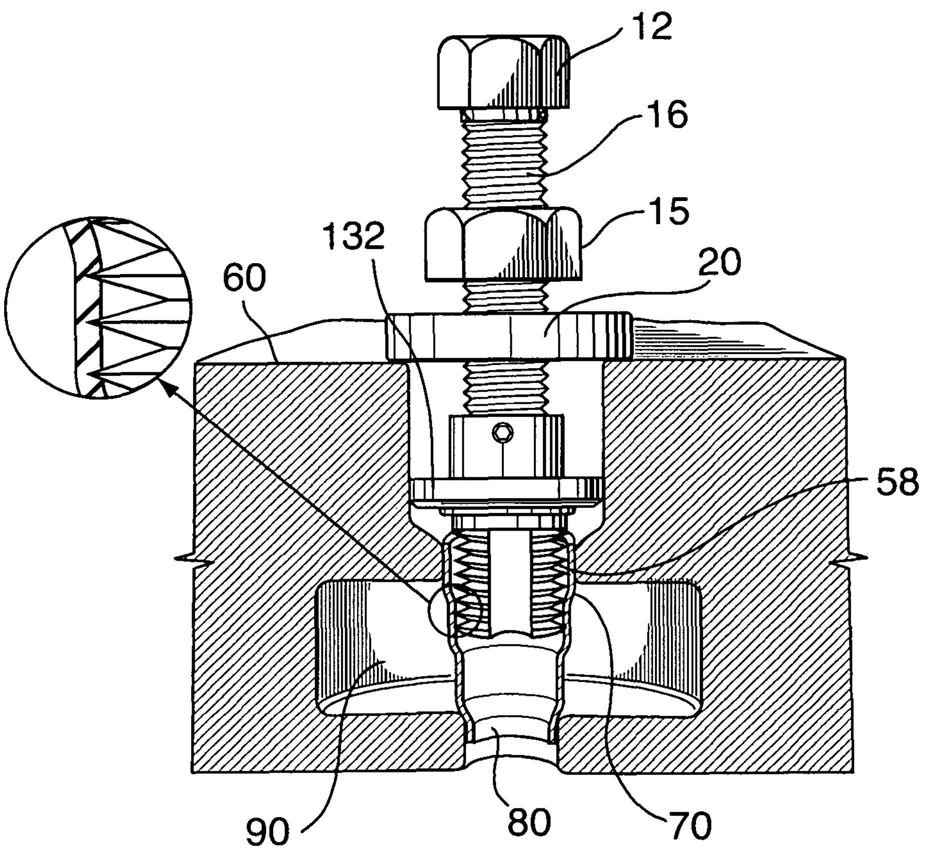
FIG. 3 is yet another embodiment of the injector sleeve removal tool.

FIG. 3 shows an optional stop mean 154 comprising a washer 20 used to limit penetration of the nut 15 into the cylinder head 60.

FIGS. 5-8 and 10-12 show an alternate embodiment of the assembled tool 150 for removing an injector sleeve described as follows. An axially movable threaded drive member including external holding means comprises a rotating extraction nut 15 is threaded onto a bolt 10 having a head 12 defining a holding means extending from a shaft 14 having threads 16 at least along the distal end thereof opposite the head 12. In the embodiment of FIG. 1, about one and one half inches of the threads 16 of bolt 10 extend through rotating extraction nut 15.

A tap 51 threadably engages threads 16 of the bolt 10 and is immovably held in a selected position by a set screw 140 threadably engaging a threaded hole 53 formed in the non-threaded upper portion 55 of the tap 51. The set screw 140 provides a removable an adjustable means for threadably engaging the bolt 10. Of course, as described heretofore and shown in FIGS. 1-4, a stationary nut 12 could be used as an alternate means for adjustably and removably attaching the tap 51 to the bolt 10 wherein the stationary nut 12 or other means could be attached by welding or casting onto a non-threaded distal end (not shown) of the tap 51. The opposing distal threaded end 52 of the tap 51 comprises a generally cylindrical threaded cutting head end portion 54 including threads 56 which extend coaxially in a horizontal plane rather than an inclined plane such as typical of a screw. Moreover, the threads 56 extend circumferentially around the end portion 54 in a discontinuous manner forming a plurality of smooth parabolic axial grooves 57 disposed between axial threaded sections 58. In at least one preferred embodiment, the six grooves are disposed between six threaded sections defining a cross sectional hexagon shape.

Figure 10:
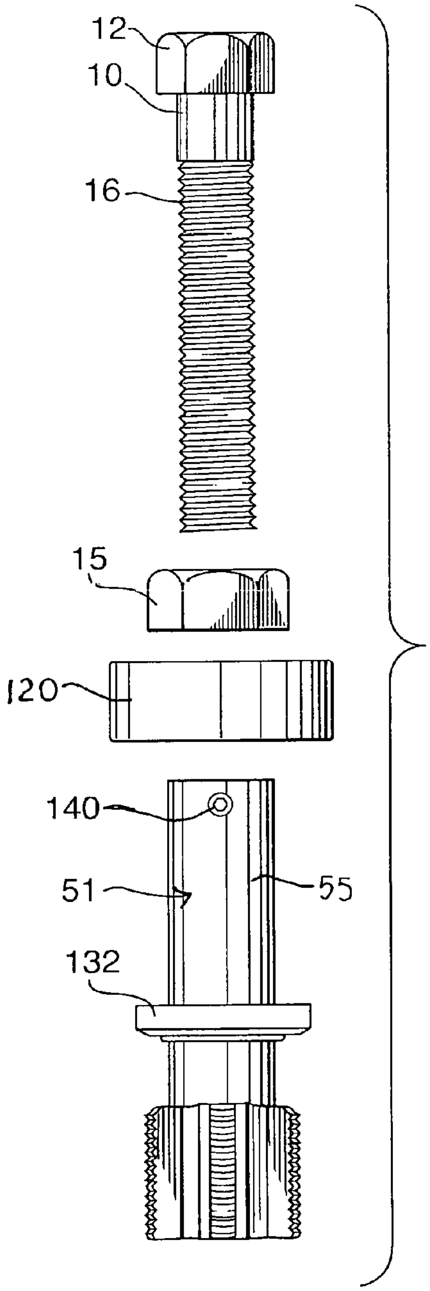
FIG. 10 is an exploded view of an injector sleeve removal tool showing the tap and threaded cutting head, the drive member for engaging the tap, the extraction nut, the bearing surface member, and cylindrical alignment member.

A washer bearing surface member 120 as shown in FIGS. 5-8 and 10-12 is disposed between the rotating extraction nut 15 and a hollow sleeve or cylinder 130 which has a large enough inner diameter for the tap 51 to rotatably move therein and for the injector sleeve 80 to easily slide up and into. The length of cylinder 130 must be longer than the cutting head 51 and stationary holding means and the available threads left on the bolt after the tool 8 is assembled with the rotating extraction nut 15, washer bearing surface member 120 and means for holding bolt head 12. Enough threads 57 must be exposed to reach into and cut at least three threads into the interior side wall of an injector sleeve 80. The washer bearing surface member 120 can be of a selected thickness but must include a center hole 121 large enough to allow axial movement along the bolt shaft 14. The diameter of the washer bearing surface member 120 must be at least large enough to engage the top end edge of the cylinder 130. As shown in FIG. 10, the washer bearing surface member 120 comprises a single thick washer which bears against the cylinder head 60 of the engine or as shown in FIG. 11 against the sleeve or cylinder 130 in order to remove the injector sleeve 80.

Figure 12:
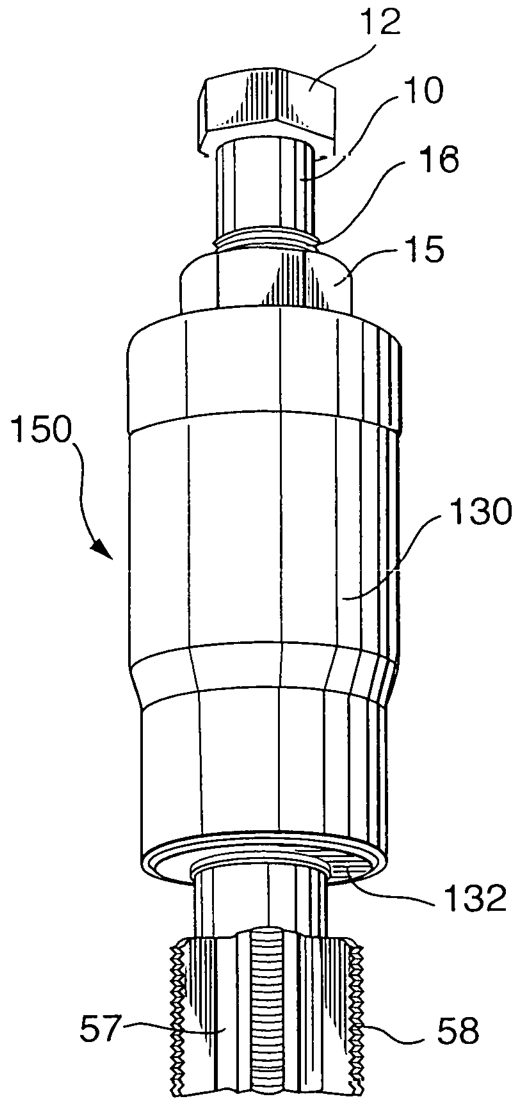
FIG. 12 is a perspective view of the injector sleeve of FIGS. 10 and 11 including a positioning cylinder.

FIG. 10 is an exploded view of an injector sleeve removal tool 149 showing the tap 51 having a longitudinal body, a threaded cutting head 54 at one end and an axial threaded bore 59 at the opposing end. The drive member 7 comprises a bolt having a head 12 at one distal end and a threaded shaft body portion 16 cooperatively engaging the axial threaded bore of the tap 51. An extraction nut 15 threadably engages the threaded shaft 16 of the drive member 7. A washer bearing member 120 sized for movable engagement on the threaded shaft 16 is disposed between the extraction nut 15 and cutting head 54. A cylindrical alignment means defining a coaxial bushing 132 is affixed to the tap 51 between the bearing surface member 120 and the cutting head 54. FIG. 11 shows the assembled injector sleeve removal tool assembly 149. FIG. 12 shows the assembly of FIG. 11 including a cylinder or sleeve 130 for engaging the bearing member 120 and providing means for positioning and/or aligning and/or limiting penetration of the tap and cutting head 54 in the cylinder head 60.

Method of use of Injector Sleeve Removal Tool

To use the tool, cylinder 130 is placed into the injector cavity against the cylinder head 60 so that the cylinder 130 straddles the injector sleeve 80. Now the bolt-tap-washer assembly is passed through the cylinder 130 and is urged and turned clockwise into the upper portion of the inner sleeve wall 70 of the sleeve 80 cutting threads into the inner wall of the sleeve 80. After at least one turn and preferably at two or three turns, threads are cut into the inner sleeve wall 70 sleeve, one holds the bolt head with one wrench while turning the extraction nut 15 clockwise with another wrench until the sleeve is withdrawn from the cylinder head and is loose. The area surrounding the injector sleeve 80 comprises a hollow portion 90 of the cylinder.

More particularly, the tool shown in FIGS. 1-8 and 13 is used for removing an injector sleeve 80 from the cylinder head 60 of a diesel engine while the head remains mounted to the engine block. A thread cutting device defining a tap 51, is modified by attaching a threaded tap nut 15 to the threaded distal end. A washer bearing surface member 20, having a center hole is disposed onto the threaded end of a bolt having a holding nut threaded thereon spaced apart a selected distance from the threaded distal end. The threaded distal end of the bolt is inserted into and threadably engages threads of the tap 51, so that the bolt is fastened to the tap.

As shown in FIG. 1, the end 31 of the cylinder 130 rests on the cylinder head 60 and more particularly within a conical depression or seat 34 formed around the injector bore 36 of the cylinder head 60 which serves as an alignment, positioning, and support means of the cutting head and tap for pulling the injector sleeve 80.

As shown in FIG. 2, a circumferential ring 35 formed around the cylinder 130 rests on the surface of the cylinder head 60 and supports the end 31 of the cylinder 130 within a conical depression above the surface of the seat 34 formed around the injector bore 36 of the cylinder head 60 wherein the cylinder 130 provides means of aligning, positioning, and supporting the cutting head 54 of the tap 51.

As shown in FIG. 3, bolts 33 extending from around the cylinder 130 rests on the surface of the cylinder head and supports the end 31 of the cylinder 130 within a conical depression above the surface of the seat 34 formed around the injector bore 36 of the cylinder head 60 wherein the cylinder 130 provides means of aligning, positioning, and supporting the cutting head 54 of the tap 51.

Figure 4:
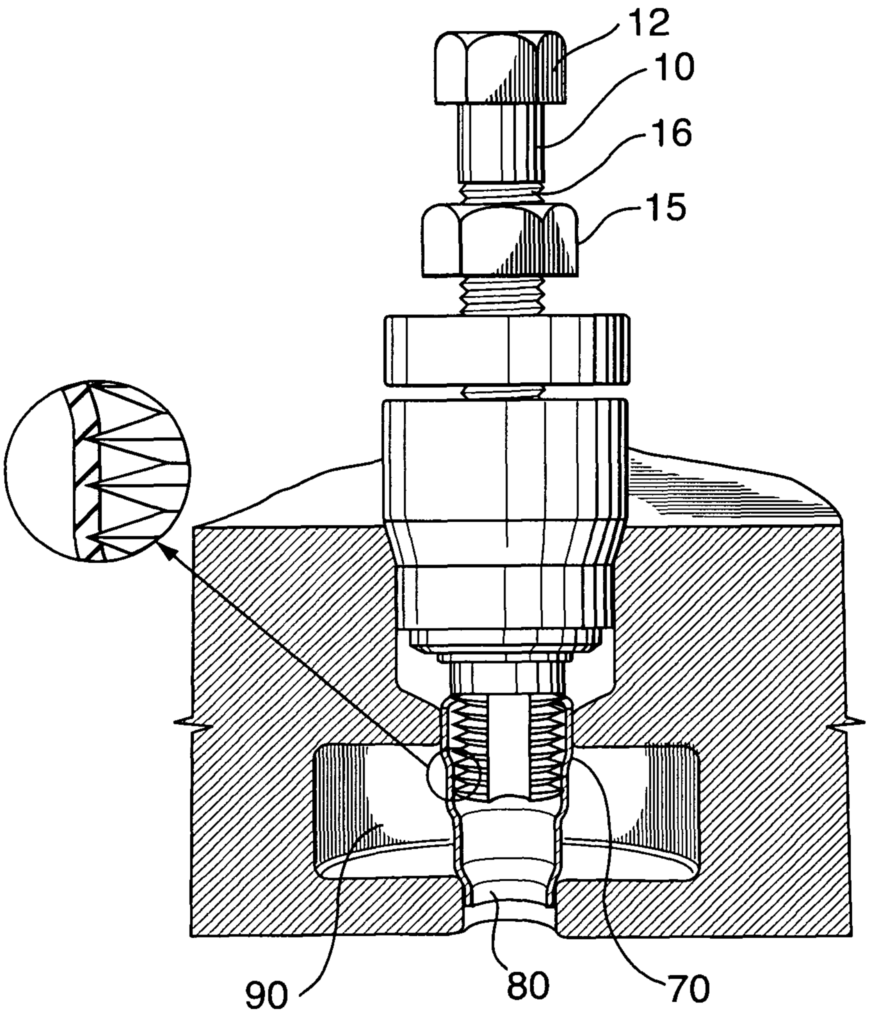
FIG. 4 is still another embodiment of the injector sleeve removal tool.
Figure 5:
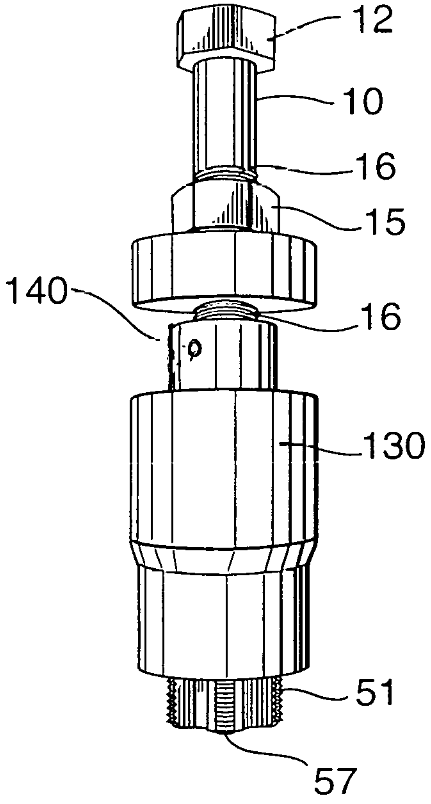
FIG. 5 is a perspective view showing an embodiment of the sleeve removal tool assembly.
Figure 6:
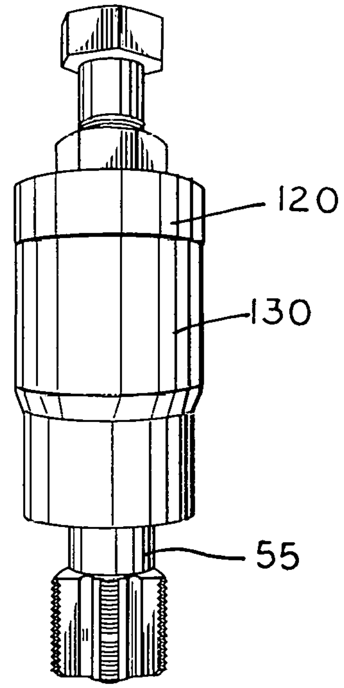
FIG. 6 is a perspective view showing an embodiment of the sleeve removal tool assembly.
Figure 7:
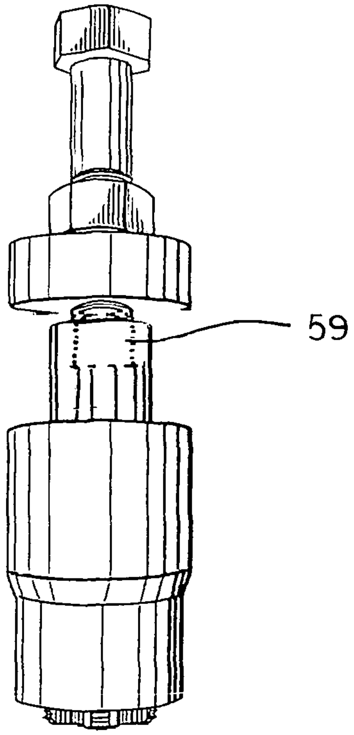
FIG. 7 is a perspective view showing an embodiment of the sleeve removal tool assembly.
Figure 8:
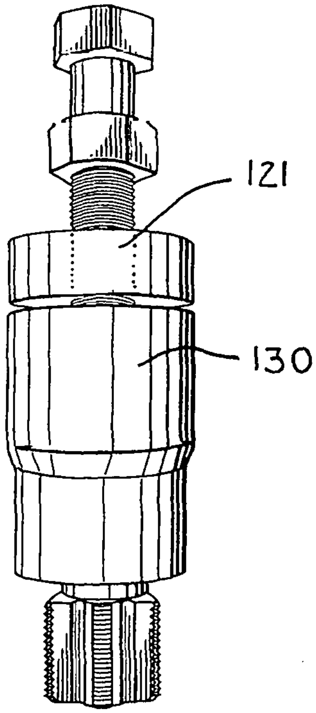
FIG. 8 is a perspective view showing an embodiment of the sleeve removal tool assembly.
Figure 9:
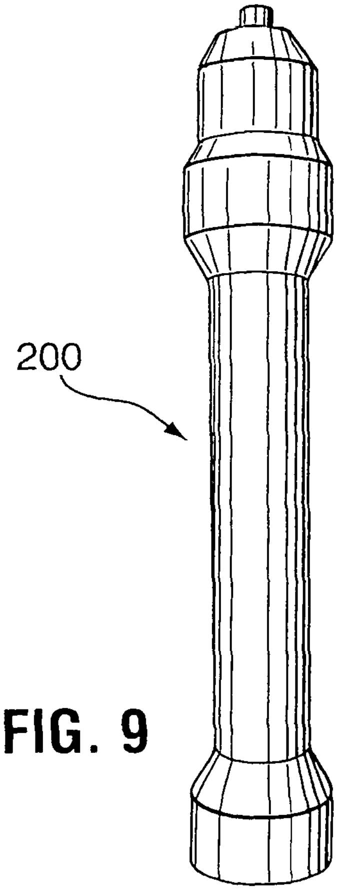
FIG. 9 is a perspective view of one type of simple injector insertion tool.

As shown in FIG. 4, pins 37 extending circumferentially around the cylinder 130 rests on the surface of the cylinder head 60 and supports the end 31 of the cylinder 130 within a conical depression above the surface of the seat 34 formed around the injector bore 36 of the cylinder head 60 wherein the cylinder 130 provides means of aligning, positioning, and supporting the cutting head 54 of the tap 51.

As shown in FIGS. 5-8, the end 131 of the cylinder 130 can rest on the surface of the cylinder head 60 or within a conical depression or seat 34 formed around the injector bore 36 of the cylinder head 60 and serve as an alignment, positioning, and support means for the cutting head and tap for pulling the injector sleeve 80. Furthermore, the cylinder 130 is formed having a bottom portion 41 having a smaller diameter than a top portion 43 with the intersection forming a circumferential lip 42 which may rest upon the cylinder head 60 and be used to provide a support means to pull the injector sleeve 80.

Figure 13:
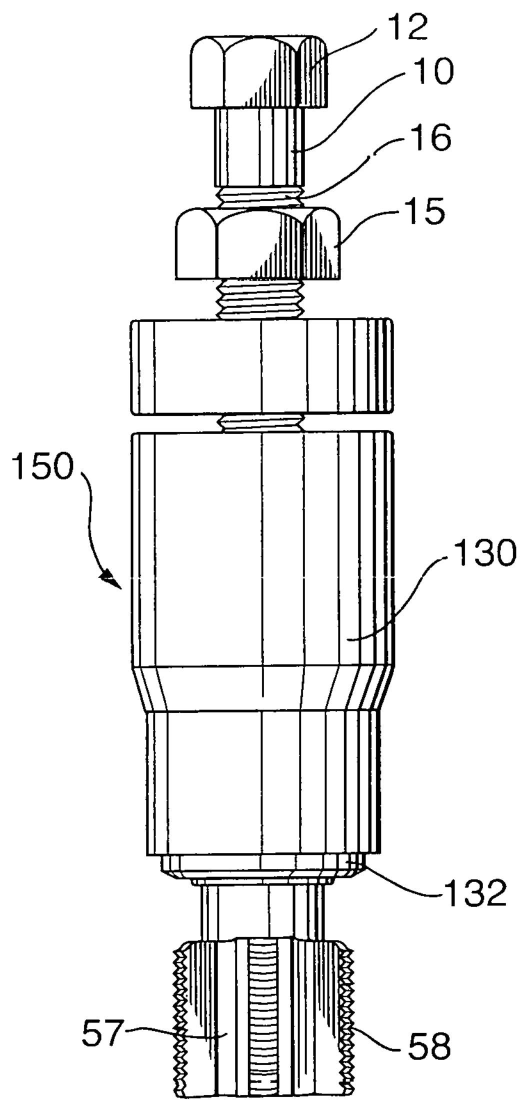
FIG. 13 is another perspective view of the injector sleeve of FIGS. 10 and 11 including a positioning cylinder.
Figure 14:
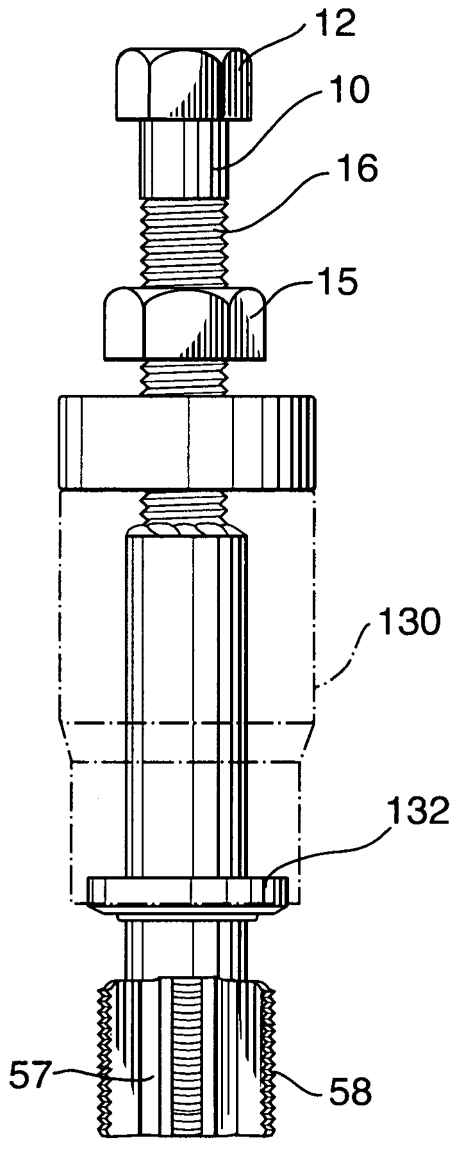
FIG. 14 is another perspective view of the injector sleeve of FIGS. 10 and 11 including a positioning cylinder drawn in phantom lines.
Figure 15:
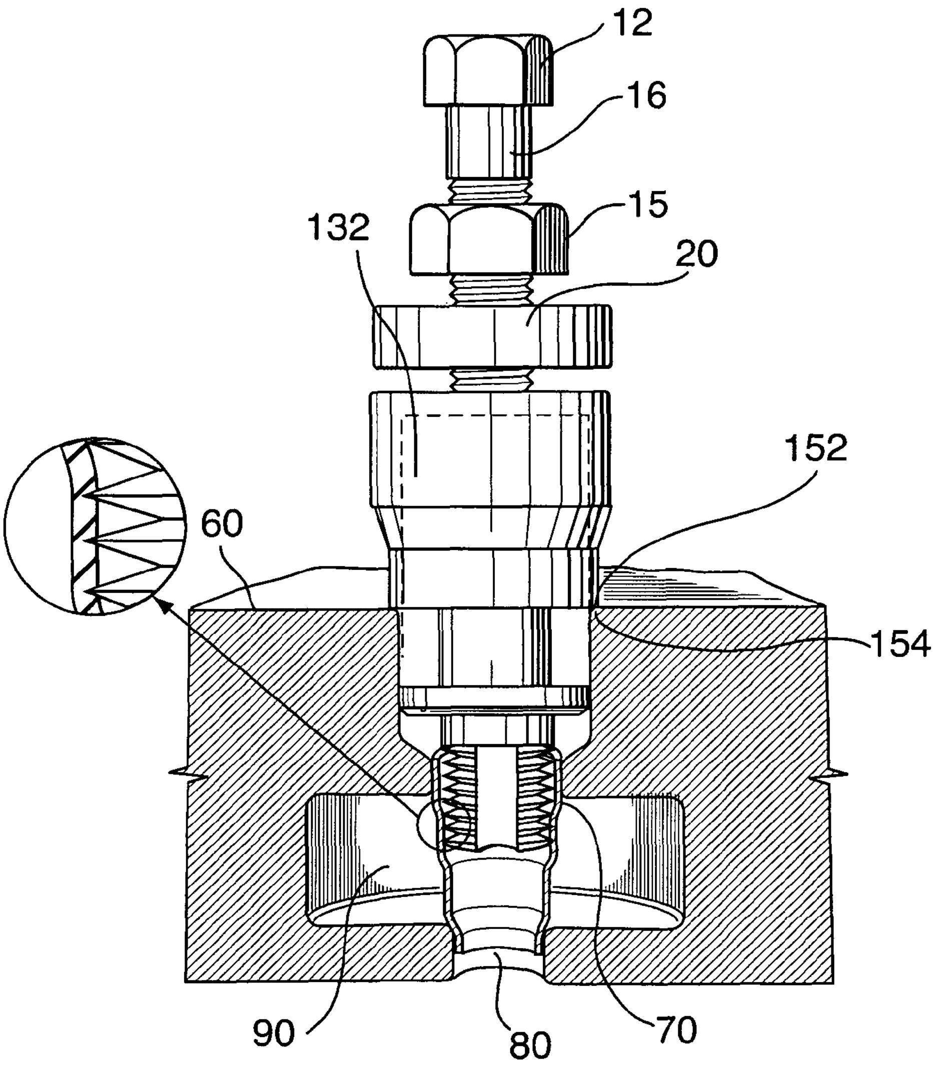
FIG. 15 is a perspective cutaway view of the sleeve removal tool being used.

The injector sleeve removal tool shown in FIGS. 11-13, shows the bearing surface member 120 providing a support means which can rest upon the cylinder head 60 and a tap 150 including an optional coaxial bushing 132 for alignment disposed between the cutting head 54 and the bearing surface member 120. The bushing 132 is not needed to exert pressure on the cylinder head, but merely acts as a guide member.

The end of the injector sleeve removal tool defining the tap assembly is passed through a hollow cylinder 130 of a selected diameter. The washer bearing surface member 120 is selected having an outer diameter large enough to provide a bottom surface for resting on the top edge of the hollow cylinder 130. The extraction nut 15 rests upon the top surface of the washer bearing surface member above the hollow cylinder 130. The drive member 7 head 12 of the bolt opposite the tap 51 assembly is rotated with a tool, whereby the distal end having the tap assembly turns to cut threads into the interior surface of the injector sleeve 80 securing same. The drive member 7 head of the bolt is held in a stationary position and the holding extraction nut 15 is then turned and moved downwardly biasing the bottom surface of the washer bearing surface member 120 against the top edges of the hollow cylinder 130 pulling the injector sleeve 80 upward and out of the cylinder head 60 in order that a replacement injector sleeve can be pressed into place in the cylinder head.

The sequential steps are as follows:

1. Remove the valve cover. (est. 30 minutes)
2. Disconnect the fuel injector electrical connector.
3. Remove the internal oil, drain plugs in the cylinder head.
4. Remove the outboard fuel injector retaining bold which holds the injector.
5. Remove the fuel injector with a little light pressure.
6. Place the injector sleeve remover (THE WRENCH) in the injector bore.
7. Manually turn the injector tool (WRENCH) CLOCKWISE 5-6 turns (until the tap is tight into the injector sleeve.
8. Tighten shoulder bolt on the wrench CLOCKWISE downward until the sleeve is removed.
9. Then put the wrench into a vice and turn the wrench COUNTERCLOCKWISE until the sleeve is released from the wrench.
10. Put the new sleeve into the injector bore.
11. Insert the Driver Tool into the new sleeve that is residing in the injector bore then tap the DRIVER TOOL with a normal hammer until the sleeve fits tightly into injector bore.
12. Reconnect the outboard fuel injector retaining bold which holds the injector.
13. Reconnect the internal oil rail, drain plugs in the cylinder head.
14. Reconnect the fuel injector electrical connector.
15. Restore the Valve cover. One side is finished.

The Injector Sleeve Installation Tool

Shown in FIGS. 18-24, the injector sleeve installation tool 200 comprises two parts, an outer shell or barrel defining an expanding mandrel 220 having a tapered end 232 and a correspondingly sized and shaped expander rod 240 having a tapered end 252. The expandable mandrel 220 includes an upper section 226 and a lower expandable portion 220 having a reduced external diameter and a tapered end 232. The lower expandable portion includes spaced apart vertical slots or slits defining five parallel fingers 224 extending down the lower portion of the outer shell 220 and forming a tapered end cap 232. The five fingers 224 are separated by five parallel slots 222. The slots 222 first terminate at the tapered end cap 232. At the terminal end of the slots 222, a center hole is drilled in the end cap 232 to prevent cracking and breaking of the fingers 224.

At the open end of the lower expandable portion 220 is an aperture through which the tapered end 252 of the expander rod 240 is inserted. The expanding mandrel 230 includes an interior cavity 223 which is approximately the same size and shape as the expander rod 240. The rod 240 includes a hexagonally shaped head 242 at the end opposite of the tapered end 252. Just below the hex head 242, the rod has external threads 244 which engage internal threads 243 within the outer shell expanding mandrel 230. As the expander rod 240 is threaded into the outer shell lower expandable portion 220, the five fingers 224 are urged radially outward.

Figure 16:
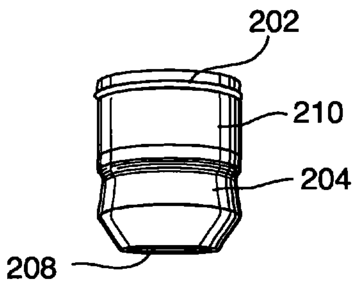
FIG. 16 is a perspective side view of an injector sleeve.
Figure 17:
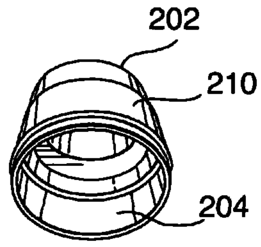
FIG. 17 is a perspective view of the top opening of the injector sleeve.
Figure 18:
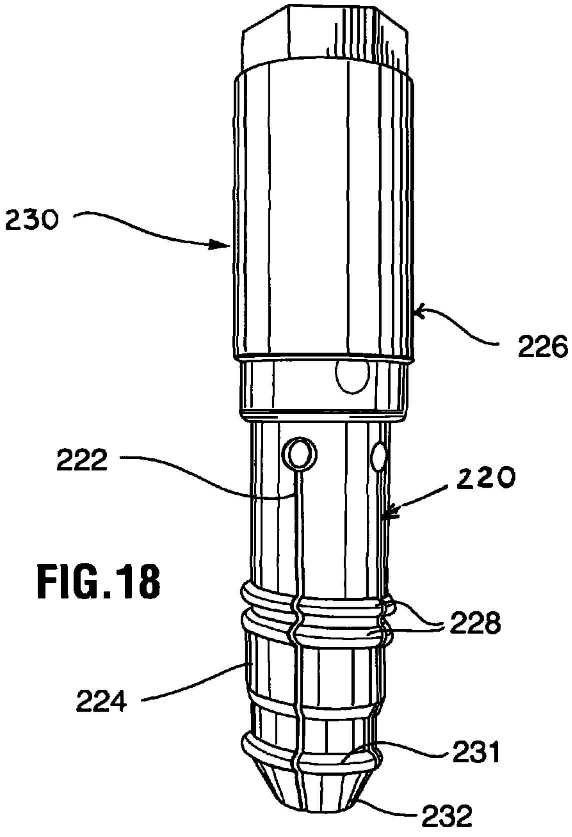
FIG. 18 is a perspective side view of the shell portion of the injector sleeve installation tool.
Figure 19:
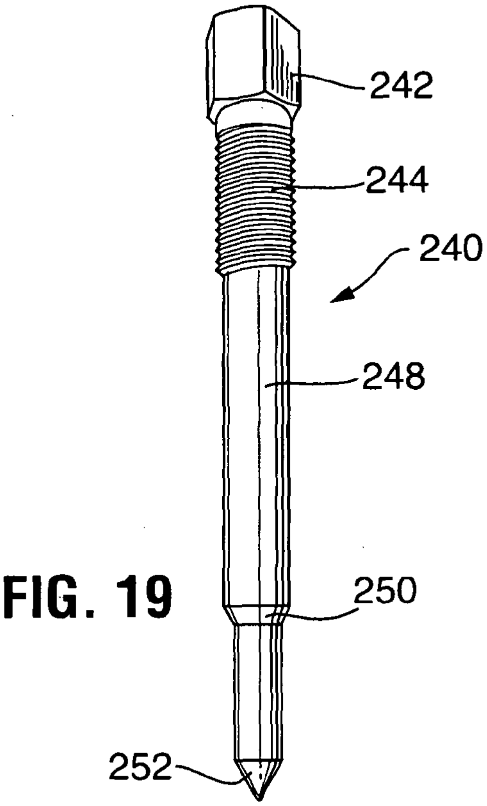
FIG. 19 is a perspective side view of the expander rod portion of the injector sleeve installation tool.
Figure 20:
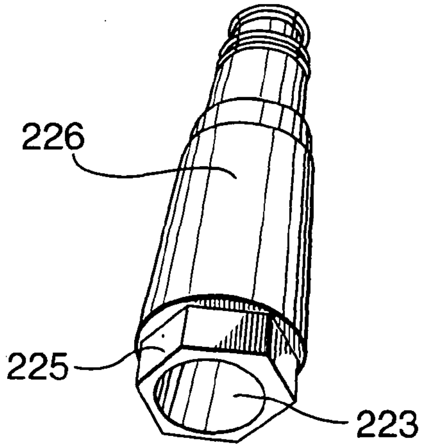
FIG. 20 is a perspective side view of the shell portion of the injector sleeve installation tool showing the top opening.
Figure 21:
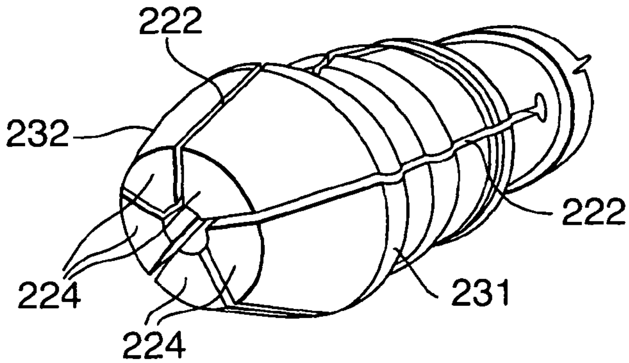
FIG. 21 is a perspective end view of the shell portion of the injector sleeve installation tool.
Figure 22:
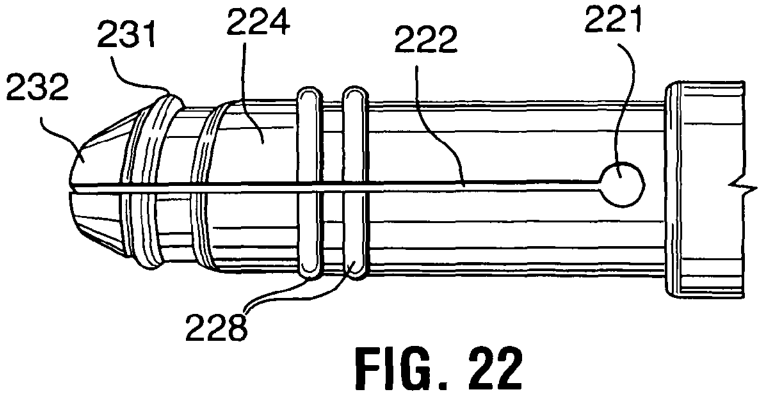
FIG. 22 is another perspective side view of the shell portion of the injector sleeve installation tool.
Figure 23:
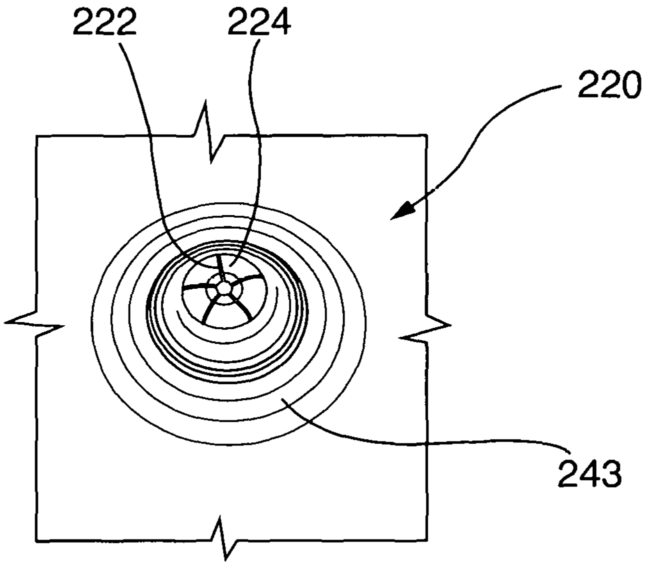
FIG. 23 is a perspective inside view of the shell portion of the injector sleeve installation tool through the top opening.
Figure 24:
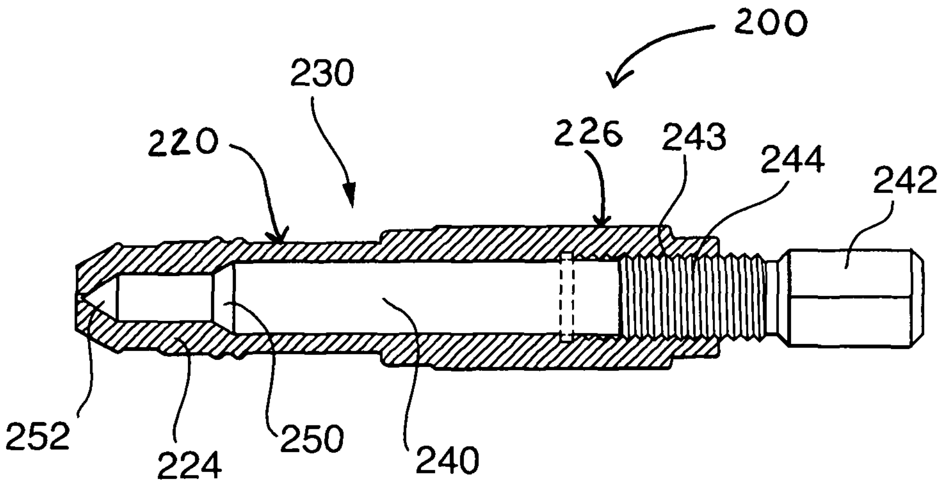
FIG. 24 is a cross sectional view of the installation tool.
Figure 25:
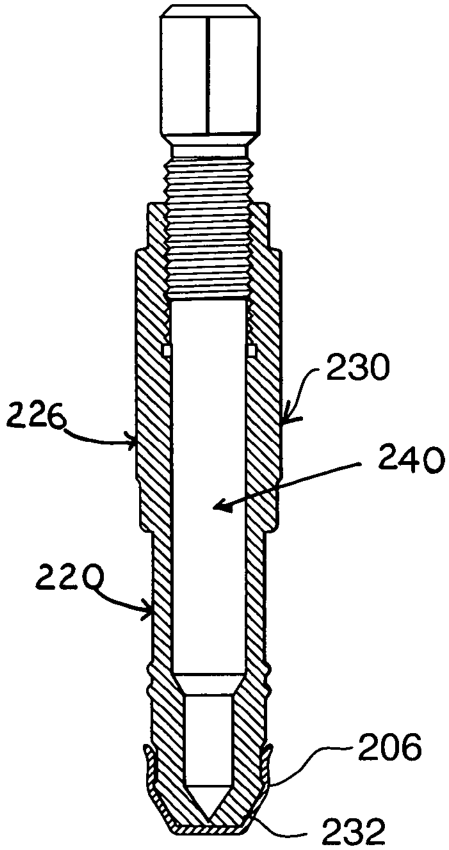
FIG. 25 is a sectional view showing the expander rod disposed within the shell which is inserted into the opening of an injector sleeve or cup.
Figure 26:
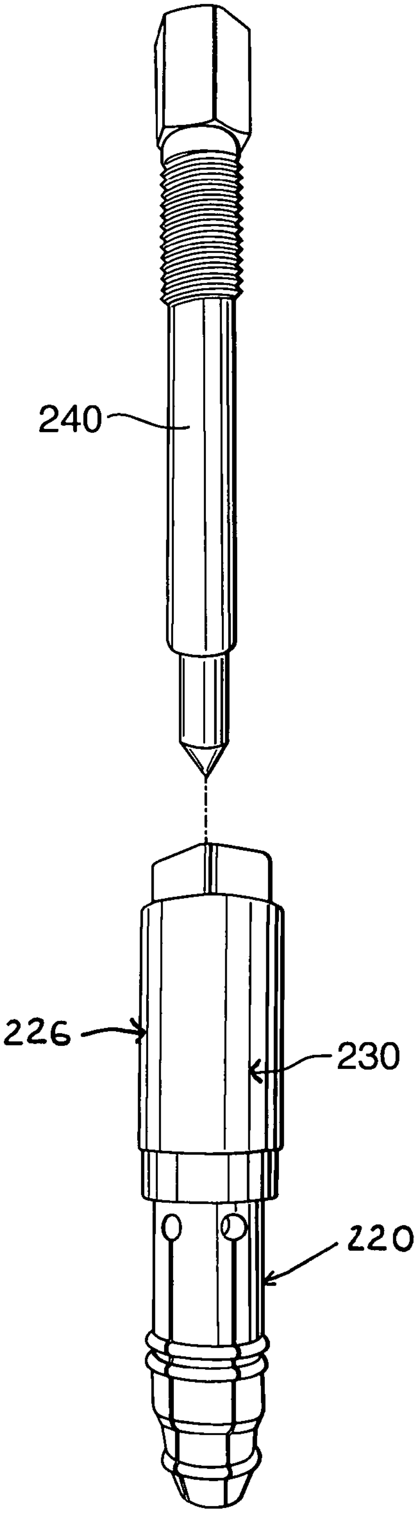
FIG. 26 is a perspective view of the expander rod and shell.

An injector sleeve 202 shown, in FIGS. 16 and 17 includes an open conical tip 208, cylindrical middle body portion 204, and open larger diameter cylindrical upper body sleeve portion 210 sized to easily slide into a bore within the diesel cylinder head. Because the sleeve slides easily in and out of the cylinder head, once the sleeve 202 is in the head, the sleeve must be expanded to fixedly hold the sleeve in place. To accomplish this expanding of the sleeve, the tapered end cap 232 of the outer shell lower expandable portion 220 of the sleeve installation tool 230 is fully inserted into the larger end 210 of the sleeve 202. With the tapered end cap 232 of the outer shell lower expandable portion 220 fully inserted into the sleeve 202, the hex head of the expander rod 240 is turned clockwise while holding the hex head 225 of the outer shell expanding mandrel 230 stationary, thus causing the fingers 224 to spread radially outward and causing expansion of the lower expandable portion 220 of the expandable mandrel 230 and of sleeve 202. The external annular ribs 231 and 228 are positioned within the sleeve 202 so that the sleeve is expanded at desired positions which will lock the sleeve 202 in the cylinder head. After expanding the sleeve 202, the hex head 242 is turned counter clockwise with respect to the hex head 225 to retract the expander rod and to relax the fingers 224 to a relaxed and un-expanded state. Now the tool 230 is withdrawn from the sleeve.

It is anticipated that other sleeves of different lengths and configurations require expansion tools of different configurations wherein annular rib portions such as 228 and 231 are located in key positions to cause expansion of other sleeves in areas which cause the sleeve to be locked in place in cylinder heads suited to these sleeves.

Whereas the installation tool described herein has five expansion fingers 224, it is anticipated that a other embodiment have three to eight or more expansion fingers.

The Injector Sleeve Kit

The injector sleeve kit includes the sleeve removal tool 8 and the sleeve installation tool 230.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. An injector sleeve installation tool comprising:

an outer approximately cylindrical shell having a circular aperture formed in a first end thereof, said circular aperture and a plurality of internal threads coaxial with said approximately cylindrical shell, internal threads adjacent to said circular aperture, a second end of said outer approximately cylindrical shell having at least three parallel longitudinal fingers being parallel to an axis of said outer approximately cylindrical shell, said three fingers separated by at least three longitudinal slits reaching from said second end to a distance of about half a length of said outer approximately cylindrical shell, said at least three fingers forming an outer circumference of said second end of said outer approximately cylindrical shell, said at least three fingers being tapered at said second end and having annular rib portions formed at selected positions along said outer approximately cylindrical shell, the entire length of said outer approximately cylindrical shell having a longitudinal cavity formed therein and a longitudinal expansion rod shaped to fill said cavity of said outer approximately cylindrical shell, said rod having a first tapered portion at a first end thereof and a second tapered portion placed at a position about one fourth of the way from said first end, said rod having a hexagonal shaped head at a second end thereof, said rod having external threads formed thereon adjacent to said hex head, said rod capable of being inserted and threaded into said outer approximately cylindrical shell, said threading of said rod into said outer approximately cylindrical shell causing said expansion rod to move axially inward to said outer approximately cylindrical shell, and an axial movement of said tapered sections of said rod causing radial spreading of said at least three fingers.

2. An injector sleeve kit including an injector sleeve removal tool and an injector sleeve installation tool comprising:

said injector sleeve removal tool comprising:

a tap with a nut welded to a non-threaded end thereof;

a bolt with a loose nut threaded thereon and a flat washer slipped thereon;

said bolt with said nut threaded thereon and said washer slipped thereon tightly threaded into said nut welded onto said non-threaded end of said tap;

a hollow cylinder whose inner diameter is larger than the outer diameter of an injector sleeve to be removed and whose length is at least as long as said tap and welded nut combination but short enough to allow said tap section to penetrate and cut at least three threads into said injector sleeve; and a load bearing washer between said loose nut and said hollow cylinder; and said injector sleeve installation tool comprising:

an outer approximately cylindrical shell having a circular aperture formed in a first end thereof, said circular aperture and a plurality of internal threads coaxial with said approximately cylindrical shell, internal threads adjacent to said circular aperture, a second end of said outer approximately cylindrical shell having at least three parallel longitudinal fingers being parallel to an axis of said outer approximately cylindrical shell, said three fingers separated by at least three longitudinal slits reaching from said second end to a distance of about half a length of said outer approximately cylindrical shell, said at least three fingers forming an outer circumference of said second end of said outer approximately cylindrical shell, said at least three fingers being tapered at said second end and having annular rib portions formed at selected positions along said outer approximately cylindrical shell, the entire length of said outer approximately cylindrical shell having a longitudinal cavity formed therein and a longitudinal expansion rod shaped to fill said cavity of said outer approximately cylindrical shell, said rod having a first tapered portion at a first end thereof and a second tapered portion placed at a position about one fourth of the way from said first end, said rod having a hexagonal shaped head at a second end thereof, said rod having external threads formed thereon adjacent to said hex head, said rod capable of being inserted and threaded into said outer approximately cylindrical shell, said threading of said rod into said outer approximately cylindrical shell causing said expansion rod to move axially inward to said outer approximately cylindrical shell, and an axial movement of said tapered sections of said rod causing radial spreading of said at least three fingers.

3. An injector sleeve installation tool, comprising:

an expandable mandrel comprising a hollow cylindrical barrel defining a longitudinal cavity having an upper portion including a plurality of internal threads, and a lower expandable portion including a plurality of spaced apart vertical slits, said lower expandable portion terminating in a tapered distal end defining an end cap having a center aperture formed therein, and said expandable mandrel including at least one annular rib extending outwardly from said lower expandable portion a selected distance, and an upper end portion comprising means for cooperatively engaging a tool, said upper portion including an end portion for cooperatively engaging a tool; and a longitudinal expansion rod having a tapered end, said rod having a corresponding shape and size for cooperatively engaging said longitudinal cavity of said expandable mandrel, said rod including an upper portion and a lower portion having a smaller diameter than said upper portion forming a tapered shoulder portion therebetween positioned for cooperatively engaging a corresponding sized and shaped portion of said longitudinal cavity opposite said at least one annular rib;

said rod including a threaded upper portion for cooperatively engaging said internal threads of said upper portion of said expandable mandrel, said upper portion of said rod terminating in a head for cooperatively engaging a tool.

4. The injector sleeve installation tool of claim 3, wherein said lower expandable portion includes a plurality of annular ribs.

5. The injector sleeve installation tool of claim 3, wherein said annular rib comprises an elongated portion.

6. The injector sleeve installation tool of claim 3, wherein rotating said expansion rod threadably engaging said expandable mandrel moves said expansion rod axially inward radially expands said at least one annular rib and said tapered distal end of said expandable mandrel and expands contiguous portions of a sleeve for retaining said sleeve in a cylinder head.

7. The injector sleeve installation tool of claim 3 wherein said longitudinal cavity of said expandable mandrel and said expansion rod include a plurality of corresponding sized and shaped shoulders.

8. An injector sleeve kit including an injector sleeve removal tool and an injector sleeve installation tool comprising:

an injector sleeve removal tool for removing an injector sleeve from the cylinder head of a diesel engine between a pair of rocker arms while a head remains mounted to an engine block within a vehicle, comprising:

a tap having a threaded cutting head formed at a distal end of a longitudinal body extending from a longitudinal shaft having a drive member at a top distal end thereof and a threaded body portion;

an extraction nut threaded onto said threaded body portion of said longitudinal shaft;

a bearing surface member having an axial hole therethrough disposed between said extraction nut and said longitudinal body of said tap; and and means for supporting said bearing surface member having an axial hole there through on a cylinder head; and an injector sleeve installation tool, comprising:

an expandable mandrel comprising a hollow cylindrical barrel defining a longitudinal cavity having an upper portion including a plurality of internal threads, and a lower expandable portion including a plurality of spaced apart vertical slits, said lower expandable portion terminating in a tapered distal end defining an end cap having a center aperture formed therein, and said expandable mandrel including at least one annular rib extending outwardly from said lower expandable portion a selected distance, said an upper end portion comprising means for cooperatively engaging a tool, said upper portion including an end portion for cooperatively engaging a tool; and a longitudinal expansion rod having a tapered end, said rod having a corresponding shape and size for cooperatively engaging said longitudinal cavity of said expandable mandrel, said rod including an upper portion and a lower portion having a smaller diameter than said upper portion forming a tapered shoulder portion therebetween positioned for cooperatively engaging a corresponding sized and shaped portion of said longitudinal cavity opposite said at least one annular rib;

said rod including a threaded upper portion for cooperatively engaging said internal threads of said upper portion of said expandable mandrel, said upper portion of said rod terminating in a head for cooperatively engaging a tool.

9. An injector sleeve kit including an injector sleeve removal tool and an injector sleeve installation tool comprising:

a) an injector sleeve removal tool for removing an injector sleeve from a cylinder head of a diesel engine between a pair of rocker arms while a head remains mounted to an engine block within a vehicle, comprising:

a tap having a threaded cutting head formed at a distal end of a longitudinal body extending from a longitudinal shaft having a drive member at a top distal end thereof and a threaded body portion;

an extraction nut threaded onto said threaded body portion of said longitudinal shaft;

a bearing surface member having an axial hole therethrough disposed between said extraction nut and said longitudinal body of said tap; and means for supporting said bearing surface member having an axial hole therethrough on a cylinder head.

10. The injector sleeve removal tool of claim 9, wherein said injector sleeve removal tool includes means for aligning said cutting head disposed between said bearing surface member and said axial cutting head.

11. The injector sleeve removal tool of claim 9, wherein said cutting head threads extend coaxially therearound in a horizontal plane.

12. The injector sleeve removal tool of claim 9, said cutting head threads extending circumferentially there around in a discontinuous manner forming a plurality of spaced apart smooth parabolic axial grooves between a plurality of axial threaded sections.

13. The injector sleeve removal tool of claim 9, wherein said a cylindrical support member includes an upper body portion having a larger external diameter than a lower body portion forming an annular taper stop means for resting on a portion of said cylinder head of the engine limiting penetration of said cutting head within said sleeve.

* * * * *